United States Patent [19]

Johnson et al.

[11] Patent Number: 5,372,876
[45] Date of Patent: Dec. 13, 1994

[54] PAPERMAKING FELT WITH HYDROPHOBIC LAYER

[75] Inventors: Michael C. Johnson, Appleton; Gary V. Schultz, Kimberley, both of Wis.

[73] Assignee: Appleton Mills, Appleton, Wis.

[21] Appl. No.: 71,292

[22] Filed: Jun. 2, 1993

[51] Int. Cl.⁵ .............................................. B32B 5/04
[52] U.S. Cl. .................... 428/233; 428/234; 428/231; 428/246; 428/284; 428/308.4; 428/309.9; 428/60; 428/61; 428/131; 428/137; 162/900; 162/901; 162/902
[58] Field of Search ............... 162/900, 908, 901, 902; 428/233, 234, 235, 246, 284, 308.4, 309.9, 60, 61, 193, 131, 137

[56] References Cited

U.S. PATENT DOCUMENTS

| | | | |
|---|---|---|---|
| 3,059,312 | 10/1962 | Jamieson | 28/79 |
| 3,214,327 | 10/1965 | Wicker et al. | 428/234 |
| 3,214,331 | 10/1965 | Wicker | 162/205 |
| 3,556,940 | 1/1971 | Cronin | 162/358 |
| 3,617,442 | 11/1971 | Hurschman | 162/212 |
| 3,772,746 | 11/1973 | Ivanowicz | 478/234 |
| 4,162,190 | 7/1979 | Ashworth | 162/359 |
| 4,199,401 | 4/1980 | Liu et al. | 162/358 |
| 4,271,222 | 6/1981 | Hahn | 428/193 |
| 4,357,386 | 11/1982 | Luciano et al. | 428/234 |
| 4,369,081 | 1/1983 | Curry et al. | 156/148 |
| 4,446,187 | 5/1984 | Eklund | 428/136 |
| 4,469,740 | 9/1984 | Bailly | 428/234 |
| 4,701,368 | 10/1987 | Kinchi et al. | 428/233 |
| 4,795,480 | 1/1989 | Boyer et al. | 81/296 |
| 4,830,905 | 5/1989 | Gulya et al. | 428/234 |
| 4,988,409 | 1/1991 | Nyberg | 162/358 |
| 5,071,697 | 12/1991 | Gulya et al. | 428/234 |
| 5,182,164 | 1/1993 | Eklund et al. | 428/134 |

*Primary Examiner*—Patrick J. Ryan
*Assistant Examiner*—Richard I. Weisberger
*Attorney, Agent, or Firm*—Andrus, Sceales, Starke & Sawall

[57] ABSTRACT

A felt for use in a papermaking machine consists of a textile base fabric and a batt layer for supporting the paper web. A flow control layer is interposed between the base layer and the batt layer, to prevent rewetting of the paper web upon the paper web exiting the press nip of the paper making machine. The flow control layer is formed of a porous hydrophobic material. Pressure exerted by the press nip forces water from the paper through the upper batt layer and the flow control layer into the base layer. When such pressure is relieved, the hydrophobicity of the flow control layer prevents backflow of water to the upper batt layer and the paper web, to prevent rewetting of the web. The flow control layer is preferably formed of a spunbonded filamentary nylon material treated with a hydrophobic chemical composition, which maintains its integrity during the needling process in which the batt layer and the base layer are secured together.

7 Claims, 2 Drawing Sheets

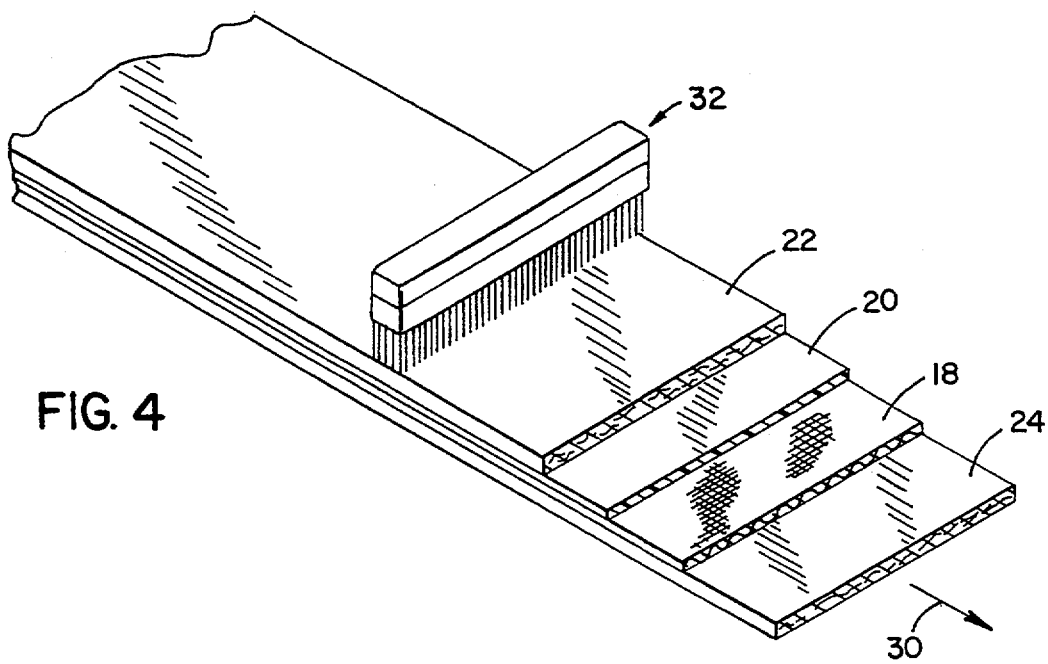
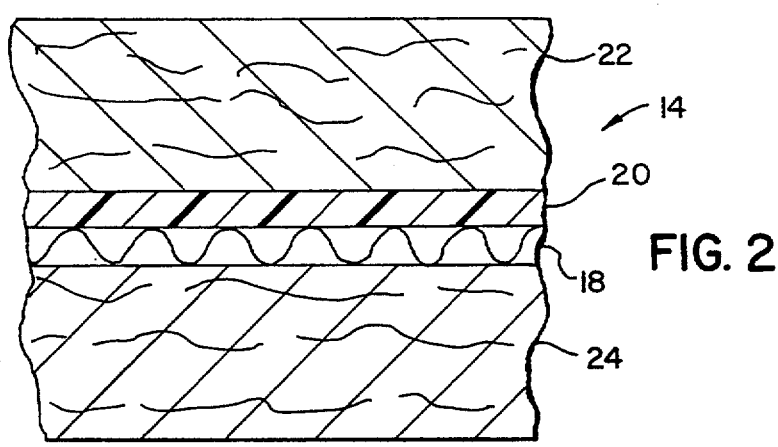
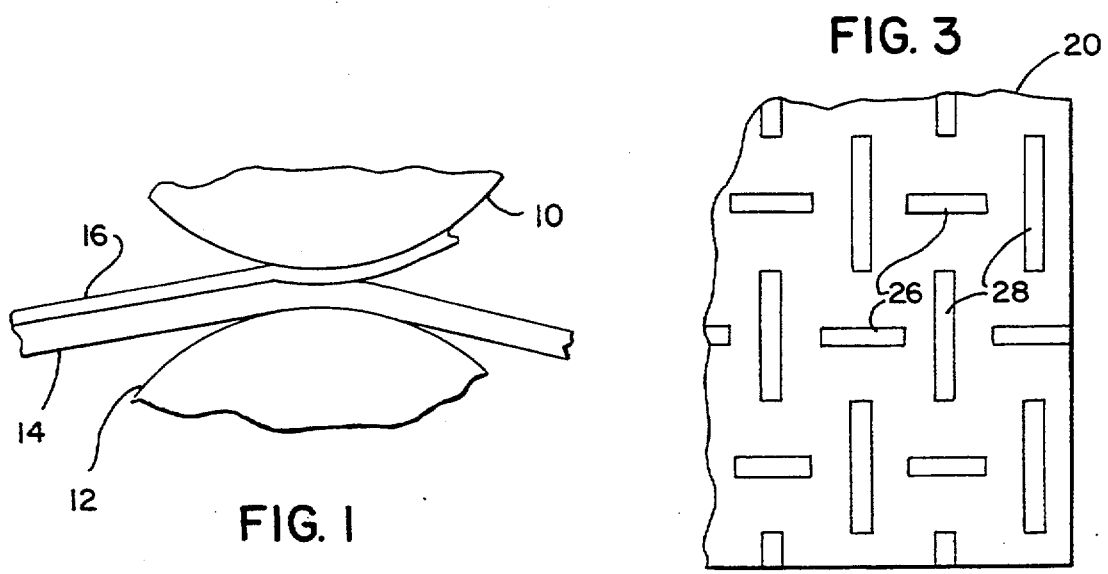

PAPERMAKING FELT WITH HYDROPHOBIC LAYER

BACKGROUND AND SUMMARY OF THE INVENTION

This invention relates to a felt construction for use in a papermaking machine, and more particularly to a felt construction which functions to minimize rewetting of the paper sheet upon exit of the sheet from the press nip of the papermaking machine.

Rewetting of a paper sheet upon exit of the sheet from the press nip of the papermaking machine is a recognized problem in the papermaking industry. Various patents address this problem, including Liu et al U.S. Pat. No. 4,199,401; Eklund et al U.S. Pat. No. 5,182,164; Ashworth U.S. Pat. No. 4,162,190; Nyberg U.S. Pat. No. 4,988,409; Cronin U.S. Pat. No. 3,556,940; Wicker U.S. Pat. No. 3,214,331; and Wicker et al U.S. Pat. No. 3,214,327.

It is an object of the present invention to provide an improved papermaking felt capable of efficiently and effectively removing water from the paper web at the press nip and preventing backflow of water through the felt upon release of the web from the press nip. It is another object of the invention to provide such a felt which is relatively simple in construction yet which performs in a highly satisfactory manner to remove water from the web and prevent rewetting.

In accordance with one aspect of the invention, a felt for use in dewatering fibrous material, such as a paper web in a papermaking machine, consists of a base fabric, a batt layer and a porous flow control layer formed of a hydrophobic material interposed between the base fabric and the batt layer. The base fabric, the batt layer and the flow control layer are joined together, such as by needling, to form a felt. When the felt is installed in the press section of the papermaking machine for dewatering the paper web, the batt layer receives water from the web, and such water is then forced through the pores of the hydrophobic flow control layer under pressure from the press nip of the papermaking machine. When the web exits the press nip and pressure on the felt and the web is relieved, the flow control layer functions to prevent backflow of water to the batt layer so as to prevent rewetting of the web. The flow control layer is preferably a sheet of synthetic spunbonded material, such as nylon, which is treated with a hydrophobic chemical composition, such as a cationic flourochemical to render the layer hydrophobic. If desired, a second batt layer may be disposed against the surface of the base fabric opposite the flow control layer and secured to the base fabric via a needling operation.

The invention further contemplates a method of making a papermaking felt. The method involves positioning a sheet of hydrophobic material between a base fabric and a batt material, and joining the base fabric, the batt material and the hydrophobic material together, such as by needling, to construct a papermaking felt, As summarized above, the sheet of hydrophobic material is preferably in the form of a sheet of spunbonded synthetic material, such as nylon, treated with a hydrophobic chemical composition.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a partial sectional view taken through a conventional press nip of a papermaking machine in which the felt of the present invention is employed;

FIG. 2 is an enlarged partial sectional view showing the construction of the papermaking felt of the invention incorporating a hydrophobic flow control layer;

FIG. 3 is a partial plan view of the material making up the hydrophobic flow control layer of the felt of FIG. 2;

FIG. 4 is a partial schematic isometric view showing the manner in which the felt of FIG. 2 is manufactured;

DETAILED DESCRIPTION OF THE INVENTION

Figure 5:
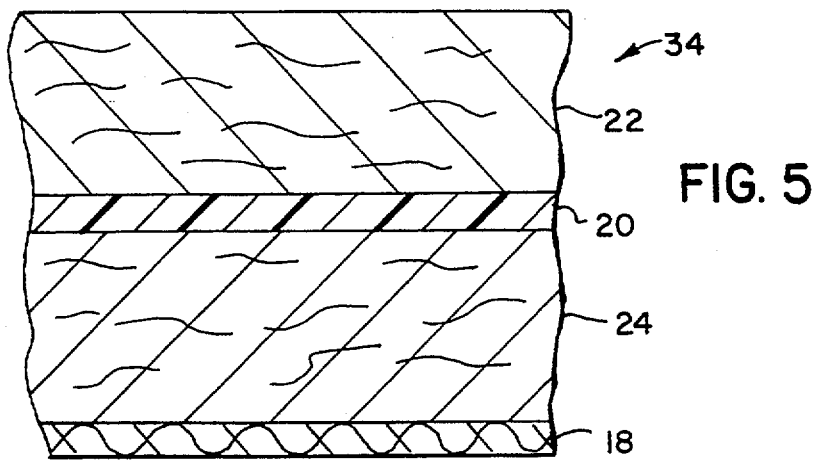
FIG. 5 is a view similar to FIG. 2, showing an alternative construction of the papermaking felt of the invention.

Referring to FIG. 1, the press nip of a papermaking machine consists of a pair of spaced press rolls 10, 12. A felt 14 supports a paper web 16, and felt 14 and web 16 travel in a left-to-right direction through the nip of rolls 10, 12, from which the pressed paper web 16 continues to the dryer section of the papermaking machine. The water expressed from paper web 16 at the nip of rolls 10, 12 passes through felt 14 and is transferred to the surface of roll 12, and is removed by a wiper or doctor blade (not shown).

FIG. 2 illustrates the construction of felt 14. Generally, felt 14 consists of a base fabric 18, a flow control layer 20, an upper batt layer 22 and a lower batt layer 24.

Base fabric 18 is a conventional endless textile fabric base layer of interwoven warp and weft yarns. The fabric of base layer 18 may be wool, synthetic, or a blend of wool and synthetic yarns. In any event, base layer 18 is constructed of tough and strong yarns in both the warp and weft directions, having a plain weave construction.

Flow control layer 20 consists of a sheet of synthetic nonwoven filamentary material, such as a spunbonded sheet of nylon 6,6. The material of flow control layer 20 consists of individual filaments of nylon material spunbonded together into sheet 4, in accordance with conventional technology. The material of flow control layer 20 has a porosity in the range of 20 to 800 cfm at 0.5 inches water in the Frazier air permeability test. Preferably, the porosity of flow control layer 20 is approximately 450 cfm at 0.5 inches water.

The material of flow control layer 20 may be a spunbonded nylon 6, 6 material such as is conventionally available from suppliers of such fabrics.

The spunbonded nylon filaments from which the material of flow control layer 20 are formed have a fineness of approximately 3 denier, and are oriented in a random direction relative to the direction of travel of felt 14.

It is understood that spunbonded materials other than nylon could be used for the material of flow control layer 20. Such materials include spunbonded polyethylene, polyester, polypropylene and rayon. Further, the filaments of flow control layer 20 may be conjoined in any other satisfactory manner, such as by hydroentangling, melt blowing, air laying, thermal or sonic bonding, or chemical bonding.

The sheet of spunbonded nylon material from which flow control layer 20 is constructed is treated with a hydrophobic chemical composition, to render flow control layer 20 hydrophobic. Preferably, the sheet of material is treated with a cationic flourochemical such as a paraffin wax emulsion, in a conventional manner, to provide hydrophobicity to the material of flow control layer 20. While this construction has been found satisfactory, it is understood that other hydrophobic materials could be used for flow control layer 20, such as a material in which the material itself is hydrophobic by nature without the need for chemical treatment. Alternatively, any other assortment of chemical compositions could be used to provide the required hydrophobicity to the material of flow control layer 20.

Referring to FIG. 3, flow control layer 20 consists of a sheet of material having a pattern of embossed areas, shown at 26, 28. Embossed areas 26, 28 are nonporous, with the individual filaments of the material of flow control layer 20 bonded together at embossed areas 26, 28. The areas of flow control layer 20 between the embossed areas 26, 28 is porous, as set forth above. The pattern of embossed areas 26, 28 renders the material of flow control layer 20 easier to work with in construction of felt 14 than has been found for a similarly constructed sheet of material without embossed areas. Embossed areas 26, 28 function to hold the filaments of flow control layer 20 together. The pattern of embossed areas 26, 28 is in no particular orientation relative the direction of travel of felt 14 during operation.

Upper batt layer 22 consists of a conventional fibrous batt made primarily of synthetic fibers blended together and carded to produce a web. The fibers of batt layer 20 may be polyamide fibers, aromatic polyamide fibers, polyester fibers, polyacrylic fibers or polyolefin fibers. Such fibers may be used in combination with a small amount of natural fibers such as wool or regenerated fibers. Lower batt layer 24 consists of batt material substantially identical to that of upper batt layer 22.

The manner in which felt 14 is constructed is illustrated in FIG. 4. First, the individual layers of felt 14 are placed in the order illustrated in FIG. 2, i.e. base fabric 18 is placed over lower batt layer 24, flow control layer 20 is placed over base fabric 18, and upper batt layer 22 is placed over flow control layer 20. Thereafter, these layers are advanced in the direction of arrow 30, and are subjected to a conventional needling operation carried out by a needling head 32. The needling operation functions to secure batt layers 22 and 24 to base fabric 18 by forcing the fibers of batt layers 22, 24 into and through the fabric of base layer 18, in a conventional manner. This needling operation also functions to force the fibers of batt layer 22 and a portion of the fibers of batt layer 24, through flow control layer 20. It is believed that, since flow control layer 20 is formed of a filamentary spunbonded material, the needling operation functions in a manner similar to that in which fabric is sewn to force the fibers of batt layer 22 through the pores of flow control layer 20, generally without severing the filaments of flow control layer 20. That is, the filaments of flow control layer 20 remain substantially intact, and flow control layer 20 maintains its integrity and is sandwiched between upper batt layer 22 and base fabric 18. In this manner, flow control layer 20 is generally continuous throughout the length and width of felt 14.

Preferably, the needling operation carried out by needling head 32 provides needling penetrations in the range of 1,000 to 3,000 needle penetrations per square inch, preferably approximately 2000 needle penetrations per square inch.

In operation, felt 14 functions as follows. At the nip of press rolls 10, 12, felt 14 and web 16 are subjected to pressure of up to 2,000 psi, which functions to squeeze water out of web 16 and into felt 14. Water squeezed out of web 16 first passes into upper batt layer 22, and the pressure exerted by rolls 10, 12 results in forcing such water through the pores of flow control layer 20 and into base layer 18 and lower batt layer 24. Upon exiting the nip of press rolls 10, 12, pressure on web 16 and felt 14 is relieved. Water which has already passed through flow control layer 20 and into base layer 18 and lower batt layer 24 has a tendency to be drawn back toward web 16. However, flow control layer 20, being hydrophobic, functions to prevent such backflow of water to upper batt layer 22, thus preventing rewetting of web 16. Flow control layer 20 thus essentially acts as a valve, permitting one-way flow of water from upper batt layer 22 through flow control layer 20 and into base layer 18 under pressure exerted by press rolls 10, 12, and to prevent backflow of water in the reverse direction when pressure from press rolls 10, 12 is relieved.

While flow control layer 20 is shown and described as being positioned between upper batt layer 22 and base fabric 18, flow control layer 20 could also be moved to other positions within a multi-layer felt construction and provide satisfactory performance in preventing rewetting of the paper web.

FIG. 5 illustrates a papermaking felt 34, also constructed according to the invention, and like reference characters will be used to facilitate clarity. In the construction of felt 34, upper batt layer 22 and flow control layer 20 are in the same position as felt 14 of FIG. 2. However, in felt 34 the positions of base layer 18 and lower batt layer 24 are reversed, such that lower batt layer 24 is located between base fabric 18 and flow control layer 20. In this construction, flow control layer 20 functions in essentially the same manner as felt 14 to prevent backflow of water from lower batt layer 24 to upper batt layer 22 when pressure on felt 34 is removed.

Figure 6:
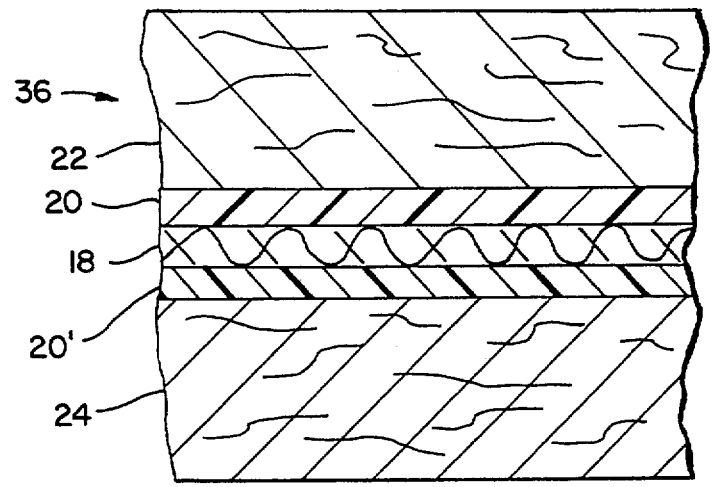
FIG. 6 is a view similar to FIGS. 2 and 5, showing yet another alternative construction of the papermaking felt of the invention.

FIG. 6 illustrates a felt 36 constructed according to the invention, and like reference characters will be used to facilitate clarity. Felt 36 includes upper batt layer 22, flow control layer 20, base fabric 18 and lower batt layer 24. However, felt 36 incorporates an additional flow control layer, shown at 20', interposed between lower batt layer 24 and base fabric 18. Flow control layer 20' functions to prevent backflow of water from lower batt layer 24 to base fabric 18, and flow control layer 20 functions the same as in felt 14 to prevent backflow of water from base fabric 18 to upper batt layer 22. Flow control layer 20' essentially serves as a backup flow control valve to relieve pressure on flow control layer 20 which otherwise may be exerted if large quantities of water were present in lower batt layer 24 and base fabric 18.

Figure 7:
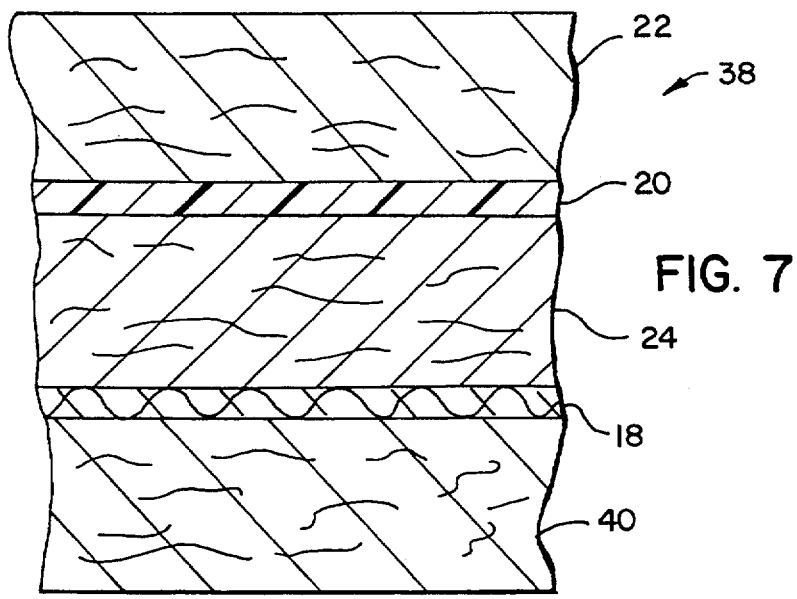
FIG. 7 is a view similar to FIGS. 2, 5 and 6, showing yet another alternative construction of the papermaking felt of the invention.

FIG. 7 illustrates a felt 38 constructed according to the invention, and like reference characters will be used to facilitate clarity. Felt 38 includes upper batt layer 22, flow control layer 20, lower batt layer 24 and base fabric 18. These layers are in the same position as in felt 34 of FIG. 5. However, felt 38 of FIG. 7 incorporates an additional batt layer 40 needled to base fabric 18 and the remaining layers of felt 38. Felt 40 functions in the same manner as felt 24 (FIGS. 2, 6) to provide flow of water from base fabric 18 to nip roll 12. Again, flow control layer 20 functions in the same manner as in felts 14, 34 and 36 to prevent backflow of water from lower batt layer 24 to upper batt layer 22 when pressure on felt 38 is relieved.

Felts 34, 36 and 38 are constructed in the same manner as described above with respect to felt 14, i.e. via a needling operation in which the various layers of felts 34, 36 and 38 are needled together.

Various alternatives and embodiments are contemplated as being within the scope of the following claims particularly pointing out and distinctly claiming the subject matter regarded as the invention.

We claim:

1. A felt for use in dewatering fibrous material in a papermaking machine, comprising:
    a base fabric defining a first surface and a second surface;
    a fibrous batt layer defining a first surface facing and supporting the fibrous material and a second surface facing the base fabric first surface;
    a porous flow control layer formed of a hydrophobic material comprising a sheet of spunbonded synthetic fibers interposed between the second surface of the batt layer and the base fabric first surface;
    wherein the batt layer, the flow control layer and the base fabric are joined together to form a felt in which water from the batt layer is forced through the flow control layer under pressure from the press nip of the papermaking machine, wherein the flow control layer functions to prevent backflow of water to the batt layer from the base fabric when pressure on the felt and the fibrous material is relieved.

2. The felt of claim 1, wherein the flow control layer comprises a layer of spunbonded filamentary nylon material.

3. The felt of claim 2, wherein the spunbonded nylon material is coated with a hydrophobic chemical composition to render the layer hydrophobic.

4. The felt of claim 1, wherein the base fabric, the batt layer and the flow control layer are joined together by a needling operation.

5. The felt of claim 1, further comprising a second batt layer joined together with the flow control layer and the first-mentioned batt layer, wherein the flow control layer is disposed between the first-mentioned and second batt layers.

6. A felt for use in dewatering fibrous material in a papermaking machine, comprising:
    a base defining a first surface and a second surface:
    a fibrous batt layer defining a first surface facing and supporting the fibrous material and a second surface facing the base first surface;
    a sheet of porous hydrophobic material comprising a sheet of spunbonded synthetic fibers interposed between the batt layer second surface and the base first surface forming a flow control layer therebetween;
    wherein the base, the batt layer and the sheet of porous hydrophobic material are joined together to form a dewatering structure in which water from the batt layer is forced through the flow control layer under pressure from the press nip of the papermaking machine, wherein the flow control layer functions to prevent backflow of water to the batt layer from the base when pressure on the felt and the fibrous material is relieved.

7. A felt for use in dewatering fibrous material in a papermaking machine, comprising:
    a fibrous batt layer defining a first surface and a second surface, the first surface facing and supporting the fibrous material; and
    a porous hydrophobic flow control layer comprising a sheet of spunbonded synthetic fibers facing the batt layer second surface;
    wherein the batt layer and the flow control layer are joined together to form a dewatering structure in which water from the batt layer is forced through the flow control layer under pressure from the press nip of the papermaking machine, wherein the flow control layer functions to prevent backflow of water into the batt layer when pressure on the felt and the fibrous material is relieved.

* * * * *